(12) United States Patent
Nguyen et al.

(10) Patent No.: US 9,677,698 B2
(45) Date of Patent: Jun. 13, 2017

(54) CONNECTOR SYSTEM AND METHOD

(75) Inventors: Dennis P. Nguyen, Pearland, TX (US);
Kirk P. Guidry, Cypress, TX (US)

(73) Assignee: Cameron International Corporation,
Houston, TX (US)

( * ) Notice: Subject to any disclaimer, the term of this patent is extended or adjusted under 35 U.S.C. 154(b) by 1141 days.

(21) Appl. No.: 12/602,651

(22) PCT Filed: Apr. 23, 2008

(86) PCT No.: PCT/US2008/061333
§ 371 (c)(1),
(2), (4) Date: Dec. 1, 2009

(87) PCT Pub. No.: WO2008/154076
PCT Pub. Date: Dec. 18, 2008

(65) Prior Publication Data
US 2010/0183360 A1    Jul. 22, 2010

Related U.S. Application Data

(60) Provisional application No. 60/934,259, filed on Jun. 12, 2007.

(51) Int. Cl.
*F16L 37/12* (2006.01)
*E21B 33/038* (2006.01)

(52) U.S. Cl.
CPC ............ *F16L 37/12* (2013.01); *E21B 33/038* (2013.01); *Y10T 403/1624* (2015.01)

(58) Field of Classification Search
USPC ..... 403/288, 293, 296, 341, 342; 285/89-93
See application file for complete search history.

(56) References Cited

U.S. PATENT DOCUMENTS

| | | | | |
|---|---|---|---|---|
| 931,128 | A | * | 8/1909 | Keith ............................. 277/520 |
| 1,893,033 | A | * | 1/1933 | Murdock et al. ............. 403/342 |
| 2,453,813 | A | * | 11/1948 | Prince .............................. 285/89 |
| 4,124,233 | A | * | 11/1978 | Ahlstone ......................... 285/18 |
| 4,575,274 | A | * | 3/1986 | Hayward .......................... 403/2 |
| 4,641,708 | A | * | 2/1987 | Wightman .................... 166/208 |
| 5,074,599 | A | * | 12/1991 | Wirbel et al. ................... 285/93 |

(Continued)

FOREIGN PATENT DOCUMENTS

FR        1482490        5/1967

OTHER PUBLICATIONS

PCT International Search Report and Written Opinion for PCT/US2008/061333, dated Jun. 8, 2008.

*Primary Examiner* — Jonathan Masinick
(74) *Attorney, Agent, or Firm* — Fletcher Yoder, P.C.

(57) ABSTRACT

A connector is provided, in one embodiment, the connector includes a collar (16) configured to receive first and second components (12,14). In this embodiment, the connector may also include a load ring (50) configured to be received in a groove (46) of the second component (12) and to move into and out of engagement with the collar (16) when the second component (12) is received by the collar (16). The connector of this illustrative embodiment may also include a locking ring (62) configured to inhibit disengagement of the load ring (50) from the collar (16). In some embodiments, engagement of the load ring (50) and the collar (16) effects securing of the first and second components (12, 14) to one another.

21 Claims, 9 Drawing Sheets

(56) References Cited

U.S. PATENT DOCUMENTS

| | | | |
|---|---|---|---|
| 5,340,163 A * | 8/1994 | Merrer et al. | 285/93 |
| 5,441,312 A * | 8/1995 | Fujiyoshi et al. | 285/23 |
| 5,871,239 A * | 2/1999 | Boscaljon et al. | 285/81 |
| 6,695,356 B2 * | 2/2004 | Nguyen et al. | 285/321 |
| 7,032,932 B2 * | 4/2006 | Guest | 285/92 |

* cited by examiner

CONNECTOR SYSTEM AND METHOD

CROSS-REFERENCE TO RELATED APPLICATIONS

This application claims priority to PCT Application No. PCT/US2008/061333 entitled "Connector System and Method", filed on Apr. 23, 2008, which is herein incorporated by reference in its entirety, and which claims priority to U.S. Provisional Patent Application No. 60/934,259, entitled "Connector System and Method", filed on Jun. 12, 2007, which is herein incorporated by reference in its entirety.

FIELD OF THE INVENTION

The present invention relates generally to connection systems for various components, such as fluid conduits. More particularly, the present invention relates to a novel stab-type connector for coupling a pair of components together in an end-to-end relationship.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, numerous companies invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components and/or conduits, such as various casings, valves, and the like, that control drilling and/or extraction operations. Additionally, various production and transport systems may also employ pipes or other fluid conduits, in addition to the components noted above.

As will be appreciated, various fluid conduits or other components of a production or transport system are typically coupled to one another to enable oil, gas, or the like to be extracted from the ground and routed to a desired location. Such fluid conduits (or "tubular members") are often coupled together in end-to-end relationships via various connectors that facilitate flow of oil, gas, or the like between the conduits. In some instances, these connectors may be subjected to large axial loads, such as gravity (particularly in the case of suspended conduits) or internal pressures within the conduits. Also, it will be appreciated that the space available for connecting conduit members may be limited in some applications. Consequently, there is a need for a durable connector that, among other things, has a low profile, provides a sealed connection between two components (e.g., fluid conduits), and can withstand the axial loads expected within a given system.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention generally relate to a novel connector for joining two components, such as tubular members or conduits. In some exemplary embodiments, the exemplary connector includes a collar configured to receive each of the two components in an end-to-end arrangement. In one embodiment, the collar is configured to be threaded onto a first of the two components and to be coupled to the second of the two components via a load ring disposed between the collar and the second component. A locking ring may also be provided to maintain and/or facilitate engagement of the load ring with the collar and to secure the first and second components to one another.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
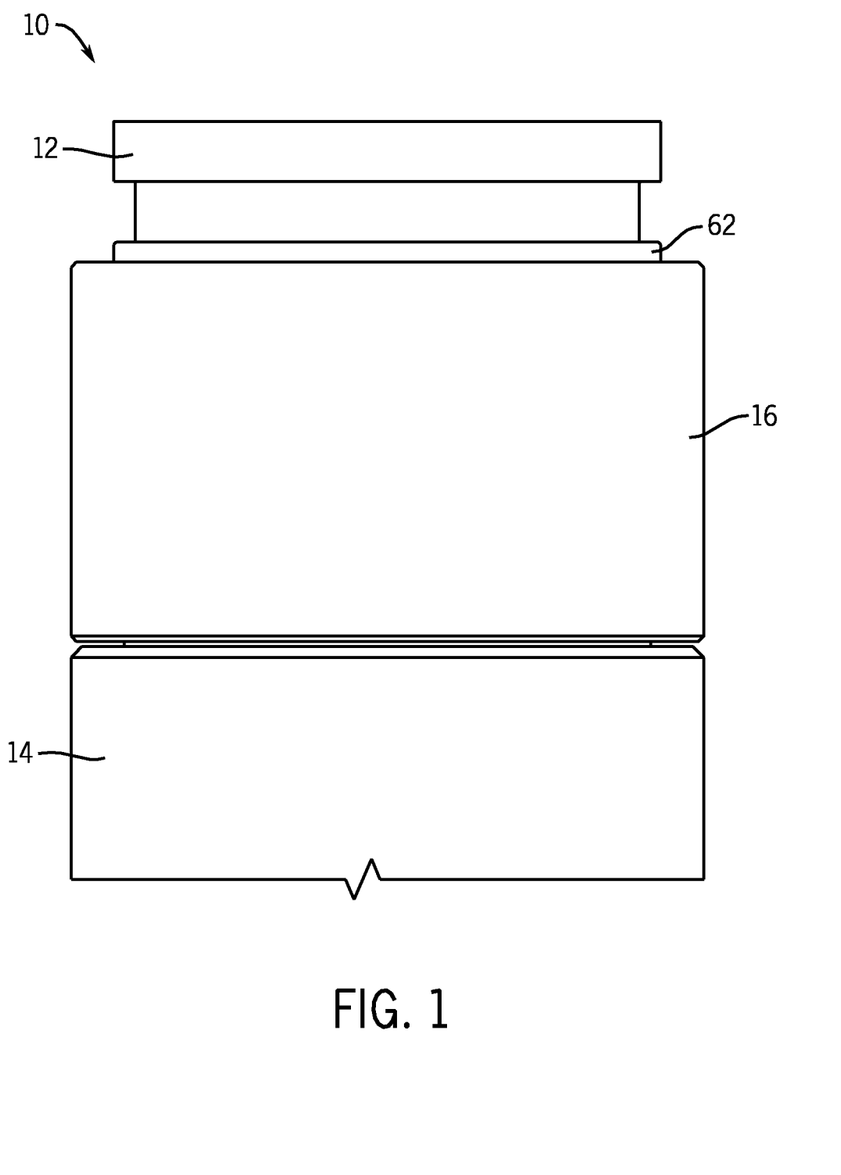
FIG. 1 is a front elevational view of a system including two connection members coupled to one another via a collar in accordance with one embodiment of the present invention.
Figure 2:
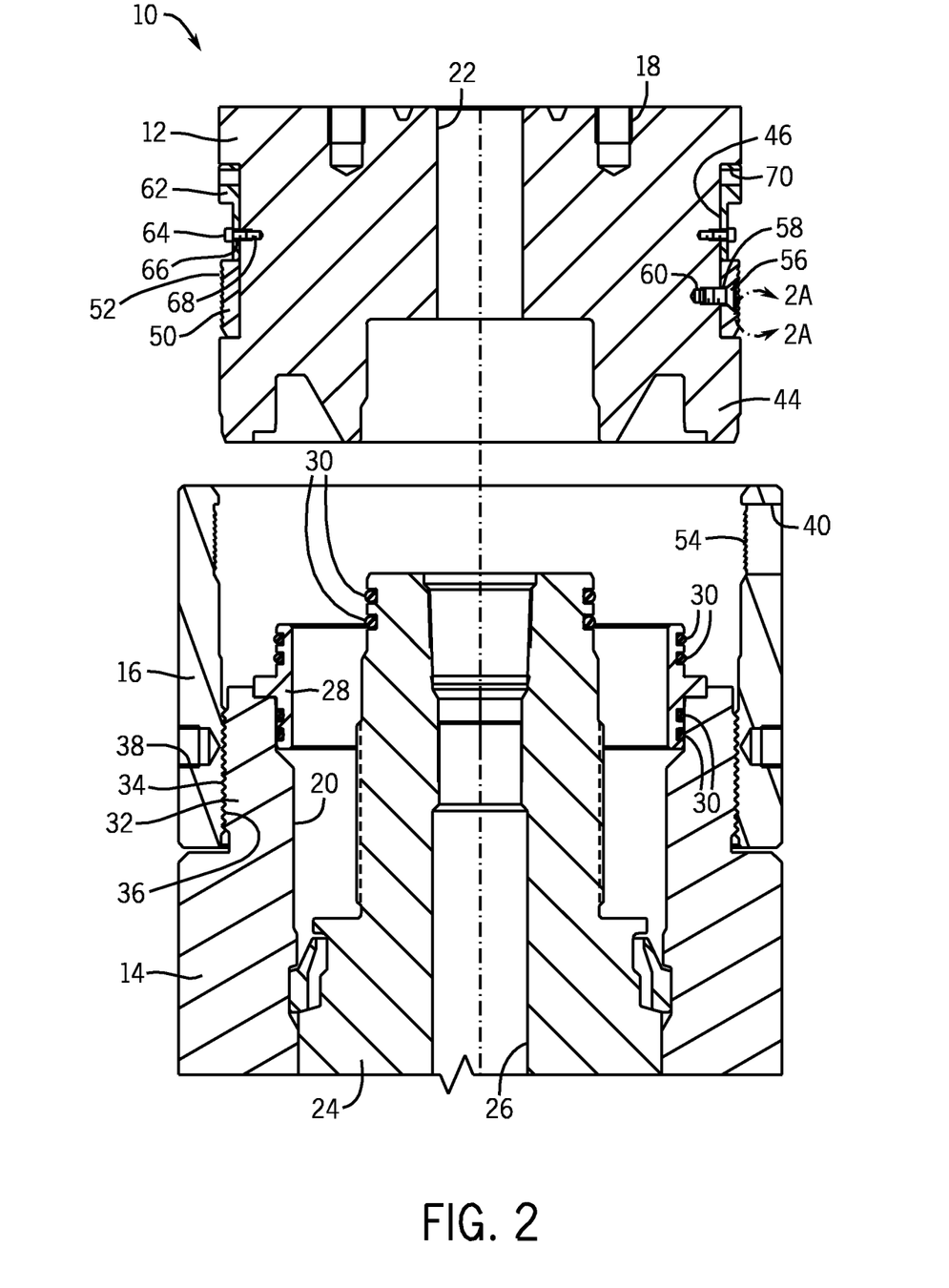
FIG. 2 is an exploded cross-sectional view of the system of FIG. 1, illustrating various features of the exemplary system, including a load ring and a locking ring coupled to one of the connection members via set screws, in accordance with one embodiment of the present invention.

Turning now to the present figures, an exemplary system 10 including a stab-type connector is illustrated in FIGS. 1 and 2 in accordance with one embodiment of the present invention. The exemplary system 10 includes a pair of connection members configured to be coupled to one another, such as a pin member or component 12 coupled to a box member or component 14. In one embodiment, the connector of the system 10 includes a union ring or collar 16 configured to cooperate with a load ring 50 and a locking ring 62 to secure the pin member 12 to the box member 14, as discussed in greater detail below.

Either or both of the pin member 12 and the box member 14 may include various mounting features 18, such as recesses, to facilitate coupling of such members to one or more additional components. In some embodiments, the pin and box members 12 and 14 are configured to enable coupling of various tubular members to one another. For example, each of the pin member 12 and the box member 14 may be coupled to a respective pipe via recesses or some other mounting features 18, allowing the two pipes to be secured to one another via the connector. Similarly, the pin and box members 12 and 14 could also be used to couple various other components together, such as a pipe to a wellhead component, a first wellhead component to a second wellhead component (e.g., in a stacked wellhead arrangement), or the like.

While the mounting features 18 in the presently illustrated embodiment include recesses configured to receive a fastener, it will be appreciated that the pin and box members 12 and 14 may be coupled to their respective components in any suitable fashion, including through threaded connections, studs, flanges, clamps, welding, or other mounting techniques. Indeed, in some embodiments, one or both of the pin and box members 12 and 14 may be provided as an integral part of such respective components. For instance, in one embodiment, the box member 14 is integrally formed as a portion of a wellhead and the pin member 12 is coupled to or integral with a "Christmas tree" or other wellhead component to be mounted on the wellhead. While certain embodiments may be described in an oil or gas (or other resource) production context, it should be noted that the presently-disclosed connection system may also be used to couple component unrelated to oil or gas production in full accordance with the present techniques.

In the presently illustrated embodiment, the box member 14 includes a bore 20 and the pin member 12 includes a bore 22. Various additional components may be received within either or both of the bores 20 and 22. For example, in one embodiment, a fluid conduit 24, such as a pipe or wellhead member, is received within the bore 20 of the box member 14. The fluid conduit 24 includes an internal bore 26, which is generally aligned with the bore 22 when the pin and box members 12 and 14 are connected to one another. A seal ring 28 and a plurality of seals 30 may also be included to inhibit fluid leakage from the various bores of the system 10.

In one embodiment, to facilitate coupling of the pin member 12 and the box member 14, the collar 16 is threaded onto an end 32 of the box member 14 via mating threaded surfaces 34 and 36. The collar 16 may also include recesses 38, which are configured to receive set screws that prevent further rotation of the collar 16 on the end 32. The exemplary collar 16 is configured to receive an end 44 of the pin member 12, in addition to the end 32 of the box member 14, such that the pin member 12 and the box member 14 may be secured to one another in an end-to-end arrangement. Notably, in the presently illustrated embodiment, the collar 16 also includes an aperture or window 40 that facilitates user access to the load ring 50 and securing of the pin and box members 12 and 14, as discussed in further detail below.

Figure 2A:
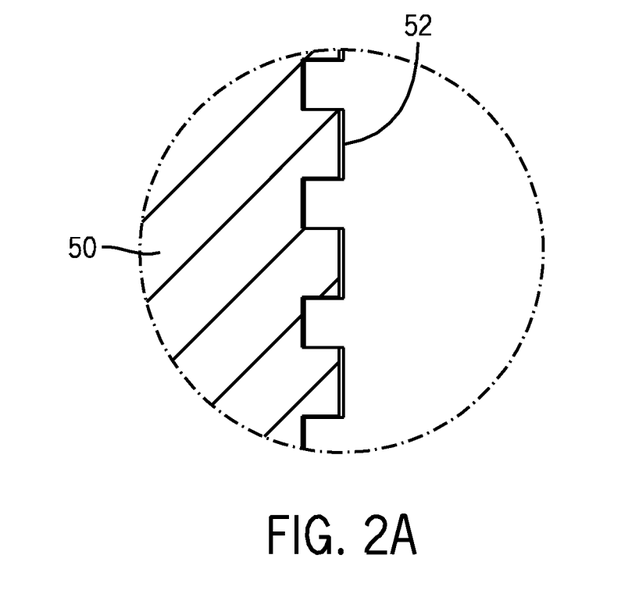
FIGS. 2A and 2B illustrate exemplary toothed surfaces of the load ring of FIG. 2 that may be provided in accordance with certain embodiments of the present invention.
Figure 2B:
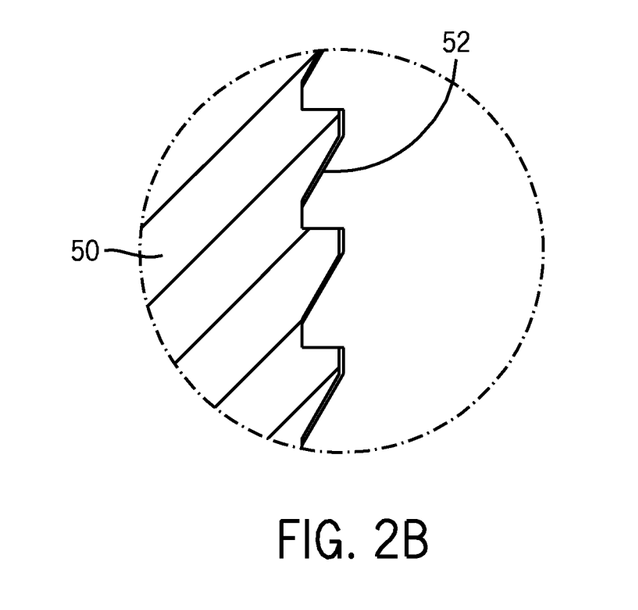

To facilitate locking of the pin and box members 12 and 14 to one another, the pin member 12 of one embodiment includes a groove 46 for receiving the load ring 50 and the locking ring 62. The exemplary load ring 50 is configured to engage the collar 16 when the pin member 12 (and at least a portion the groove 46 containing the load ring 50) in inserted into the collar 16. In some embodiments, the load ring 50 includes a number of teeth 52 configured to engage a plurality of complimentary teeth 54 provided on an inner surface of the collar 16. Such teeth 52 and 54 may be provided in various configurations, such as rectangular teeth or angled teeth, as generally depicted in FIGS. 2A and 2B, respectively.

The load ring 50 may be positioned and retained within the groove 46, and secured to the pin connection 12, via one or more set screws 56 inserted through respective apertures 58 of the load ring 50 and into threaded recesses 60 of the pin member 12. Likewise, the locking ring 62 may be secured within the groove 46 via one or more set screws 64 inserted through respective apertures 66 of the locking ring 62 and into recesses 68 of the pin member 12. Notably, in the presently illustrated embodiment, the dimensions of the groove 46, the load ring 50, and the locking ring 62 are such that the load ring 50 and/or the locking ring 62 can be substantially positioned and retained within the groove 46. As may be appreciated, such an arrangement allows the pin member 12 to be freely inserted or removed from the collar 16 without interference from the load ring 50 and/or the locking ring 62.

In some embodiments, the load ring 50 may be a split ring, such as a C-ring. Further, in the presently illustrated embodiment, the load ring 50 is outwardly biased when positioned within the groove 46 to facilitate locking of the pin member 12 to the box member 14 as discussed below. The locking ring 62 may also be split in one or more places 61 (i.e., a split ring or C-ring) to facilitate attachment of the locking ring 62 within the groove 46.

Figure 3:
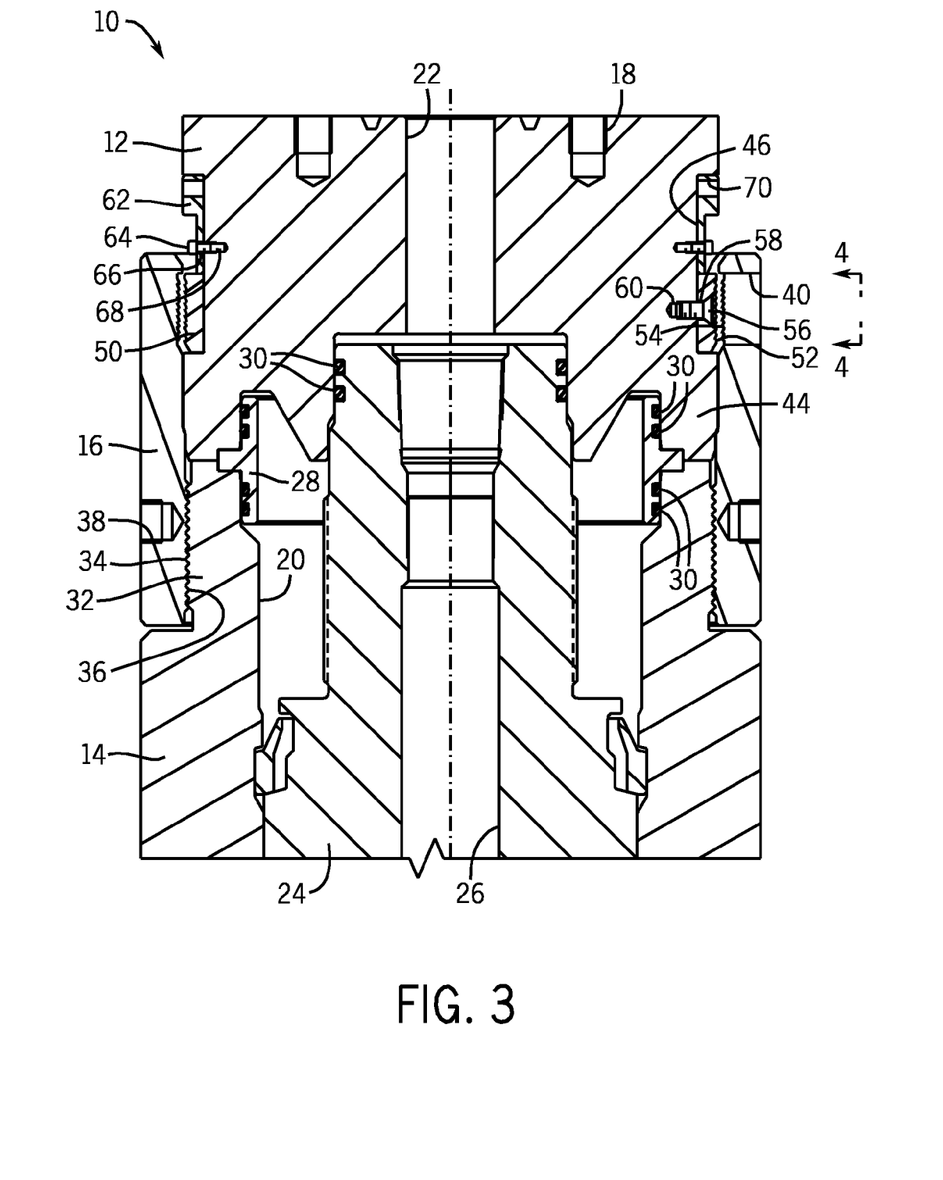
FIG. 3 is a cross-sectional view of the system of FIG. 2, illustrating the stabbing of one connection member to the other connection member in accordance with one embodiment of the present invention.
Figure 4:
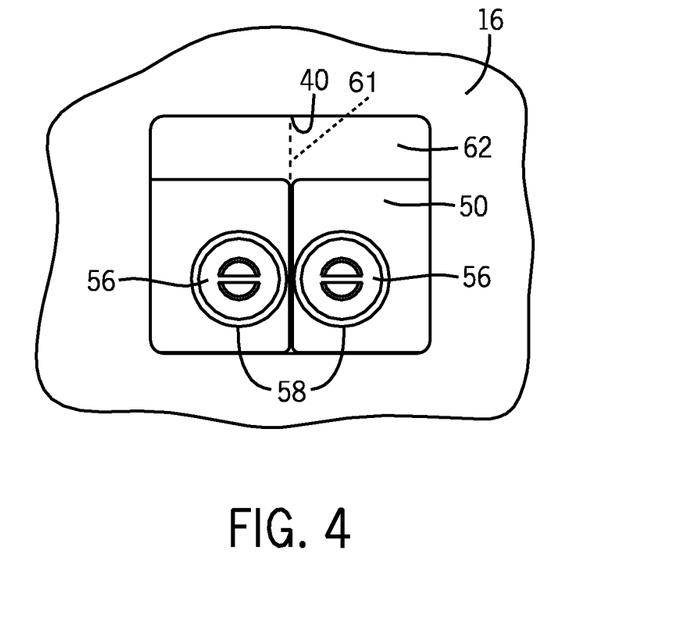
FIG. 4 is a partial detail view generally taken along line 4-4 of FIG. 3, illustrating portions of the load ring and the locking ring disposed within the collar and accessible through a window of the collar in accordance with one embodiment of the present invention.

An exemplary method for coupling the pin member 12 and the box member 14 may be better understood with reference to FIGS. 3-7. In some embodiments, following installation of the load ring 50 and the locking ring 62 within the groove 46, the pin member 12 is inserted into the collar 16, as generally illustrated in FIG. 3. Further, the set screws 56 in the load ring 50 may be aligned with the window 40 of the collar 16, such as depicted in FIG. 4, to enable a user to access the set screws 56 through the window 40. It will be appreciated that, while the exemplary window 40 of FIG. 4 is presently illustrated as a generally rectangular window, other configurations (e.g., elliptical, circular, or the like) are also envisaged.

Figure 5:
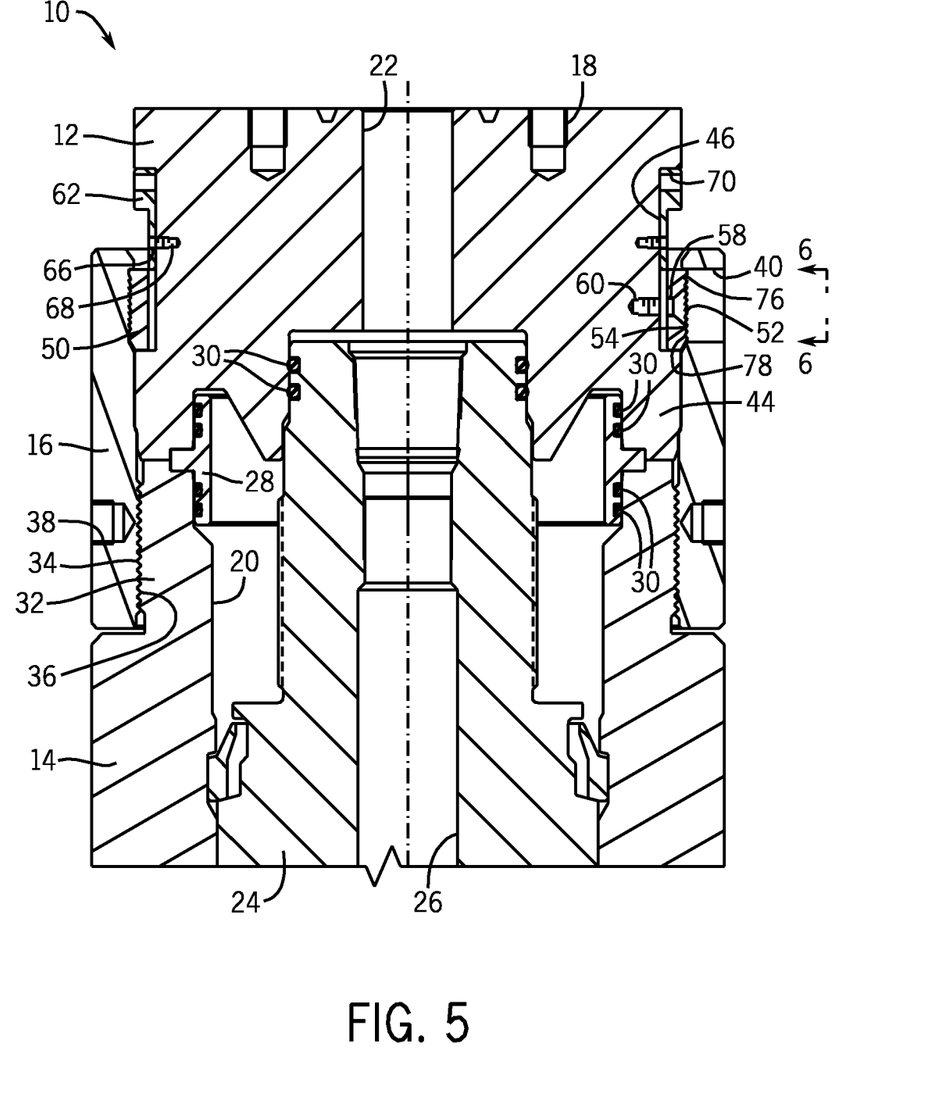
FIG. 5 is a cross-sectional view of the system of FIG. 3, illustrating the removal of the set screws from the load ring and engagement of the load ring with the collar in accordance with one embodiment of the present invention.
Figure 6:
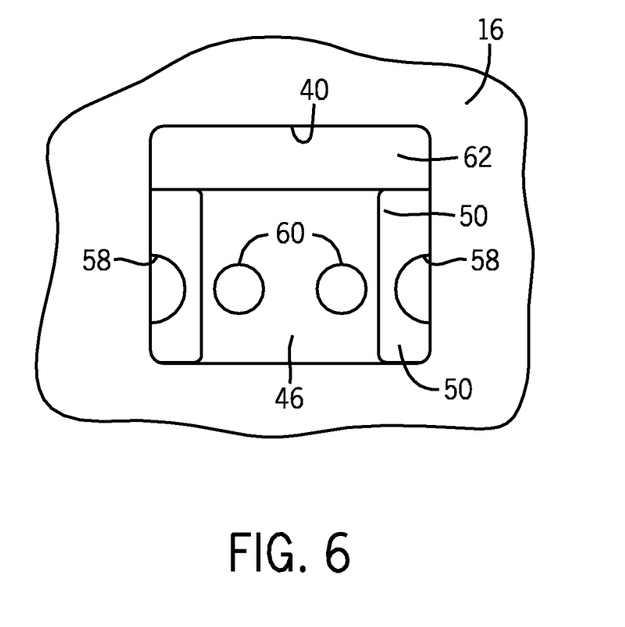
FIG. 6 is a partial detail view generally taken along line 6-6 of FIG. 5, illustrating portions of the load ring and the locking ring disposed within the collar and accessible through a window of the collar following removal of the set screws from the load ring in accordance with one embodiment of the present invention.

In some embodiments, the set screws 56 are then removed from the load ring 50 to permit the toothed surface 76 of the load ring 50 to engage a complementary surface 78 of the collar 16, as generally illustrated in FIGS. 5 and 6. As noted above, in some embodiments, the load ring 50 is outwardly biased such that removal of the set screws 56 automatically results in radial expansion of the load ring 50 from the groove 46 toward the collar 16. However, in other embodiments, a user may instead manually bring surfaces 76 and 78 into engagement. In addition to removing the set screws 56 from the load ring 50, the set screws 64 may also be removed from the apertures 66 to permit movement of the locking ring 62.

Figure 7:
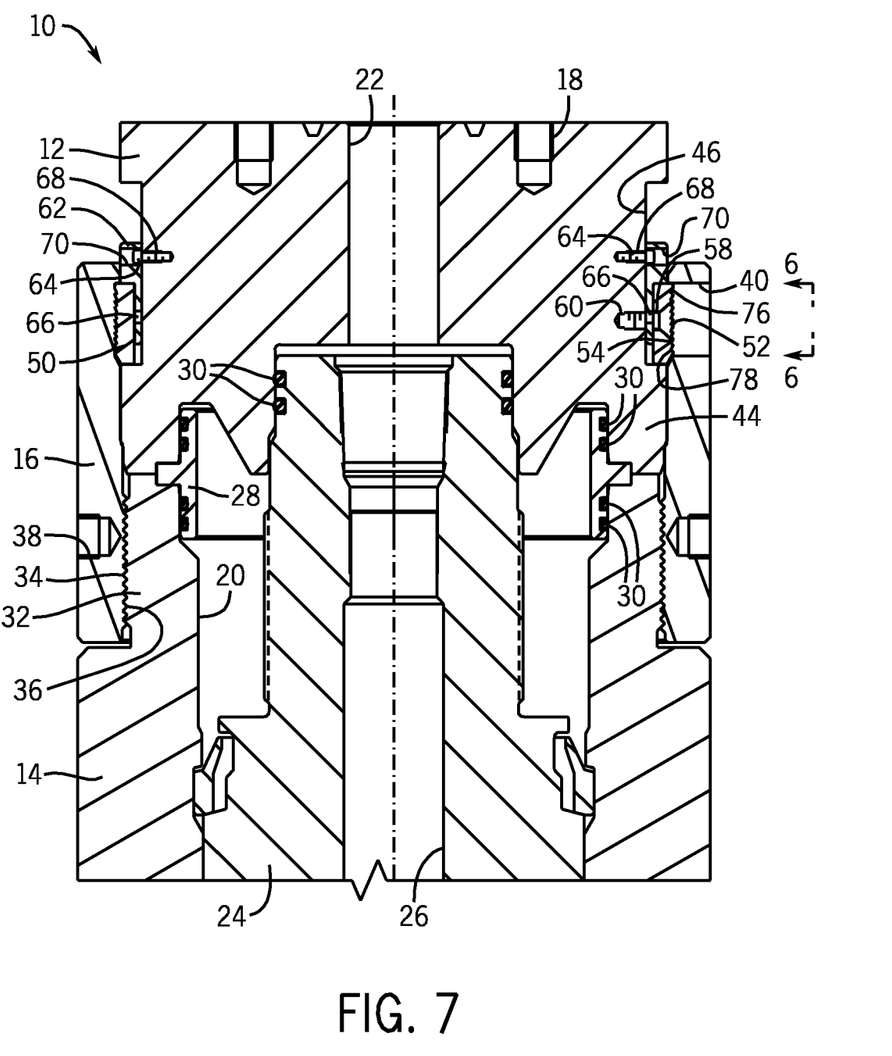
FIG. 7 is a cross-sectional view of the system of FIG. 5, illustrating the positioning of the locking ring between the load ring and a connection member to secure the load ring in engagement with the collar in accordance with one embodiment of the present invention.

For instance, in one embodiment, the locking ring 62 is moved axially from an unlocked position, as generally illustrated in FIG. 5, into a locked position between the load ring 50 and the pin member 12, as generally provided in FIG. 7. It should be noted that such interposition of the locking ring 62 facilitates positive engagement of the load ring 50 to the collar 16 such that the teeth 52 and 54 generally prevent relative axial motion of the pin member 12, the box member 14, and the collar 16 with respect to one another. Once the locking ring 62 is positioned between the load ring 50 and the pin member 12, the set screws 64 may be installed through apertures 70 to retain the locking ring 62 in its locked position.

Additionally, once the pin member 12 is secured to the collar 16, the collar 16 may be rotated on the threads 34 to remove any axial clearance, or "slack," in the connection between the pin member 12 and the box member 14. As will be appreciated, such slack may be attributable, at least in part, to the tolerances of the pin member 12 and the box member 14. In some embodiments, the system 10 is configured to minimize the amount of rotation of the collar 16 needed to remove such slack. For example, in various embodiments, the collar 16 can be rotated less than or equal to a one-half turn (i.e., 180 degrees), less than or equal to a one-quarter turn (i.e., 90 degrees), or even less than or equal to a one-eighth turn (i.e., 45 degrees) on the threads 34 to remove the slack in, and to preload, the connection. Further, in at least one embodiment, the rotation of the collar 16 on the threads 34 is the only rotation needed in the system 10 to couple the pin member 12 to the box member 14. A cover plate (not shown) may also be provided over or within the window 40 to protect the connection between the collar 16 and the load ring 50.

It should be noted that, in the presently illustrated embodiment, the collar 16, the load ring 50 and the locking ring 62 are members of a low-profile, or slender, connector suitable for use in an array of connection applications, including those that may provide a limited amount of space for connecting various members, such as in certain conductor sharing, split compact, and/or stacked wellheads. Further, it will be appreciated that the present system 10 allows for simple installation and coupling of two tubular members or components. Additionally, the pin and box members 12 and 14 may also be disconnected from one another in a simple and convenient fashion, as discussed below.

Figure 8:
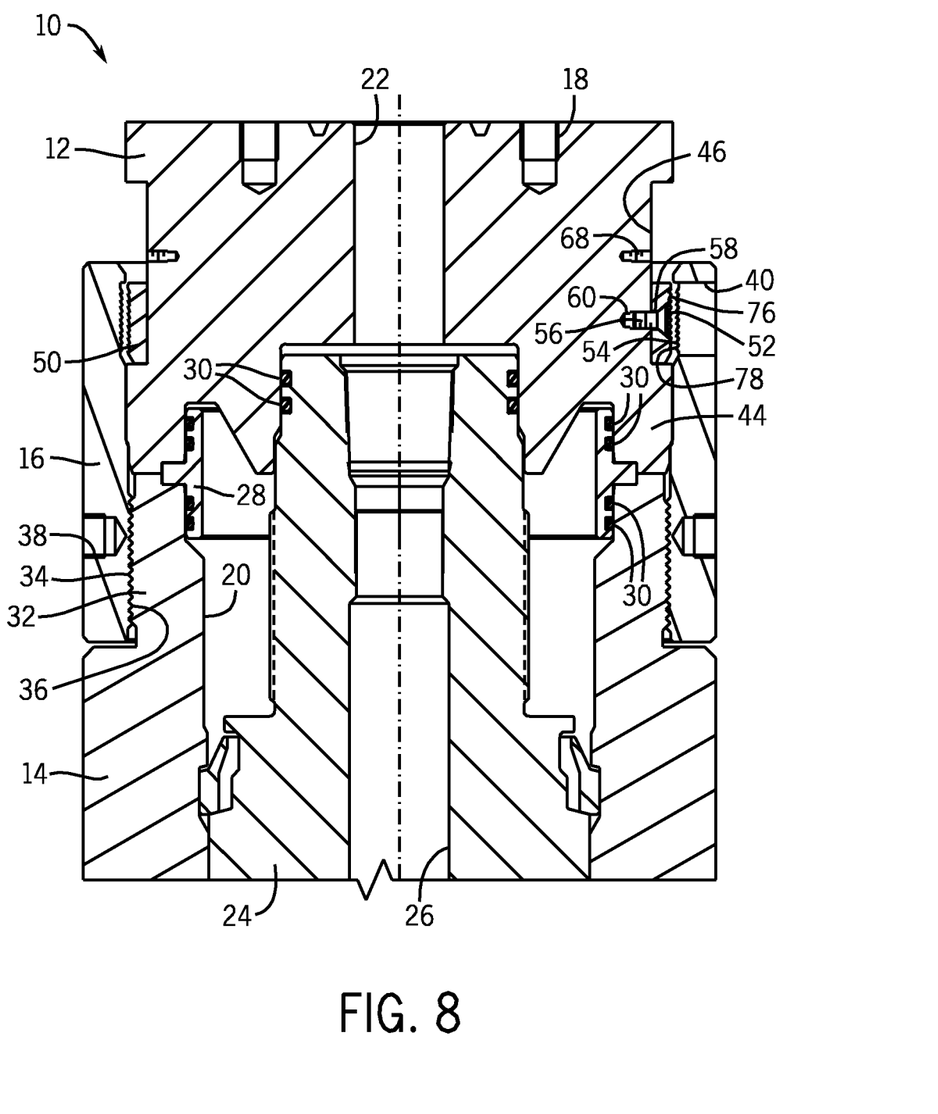
FIG. 8 is a cross-sectional view of the system of FIG. 7, illustrating the removal of the locking ring to facilitate disengagement of the load ring from the collar and the securing of the load ring to the connection member in accordance with one embodiment of the present invention.
Figure 9:
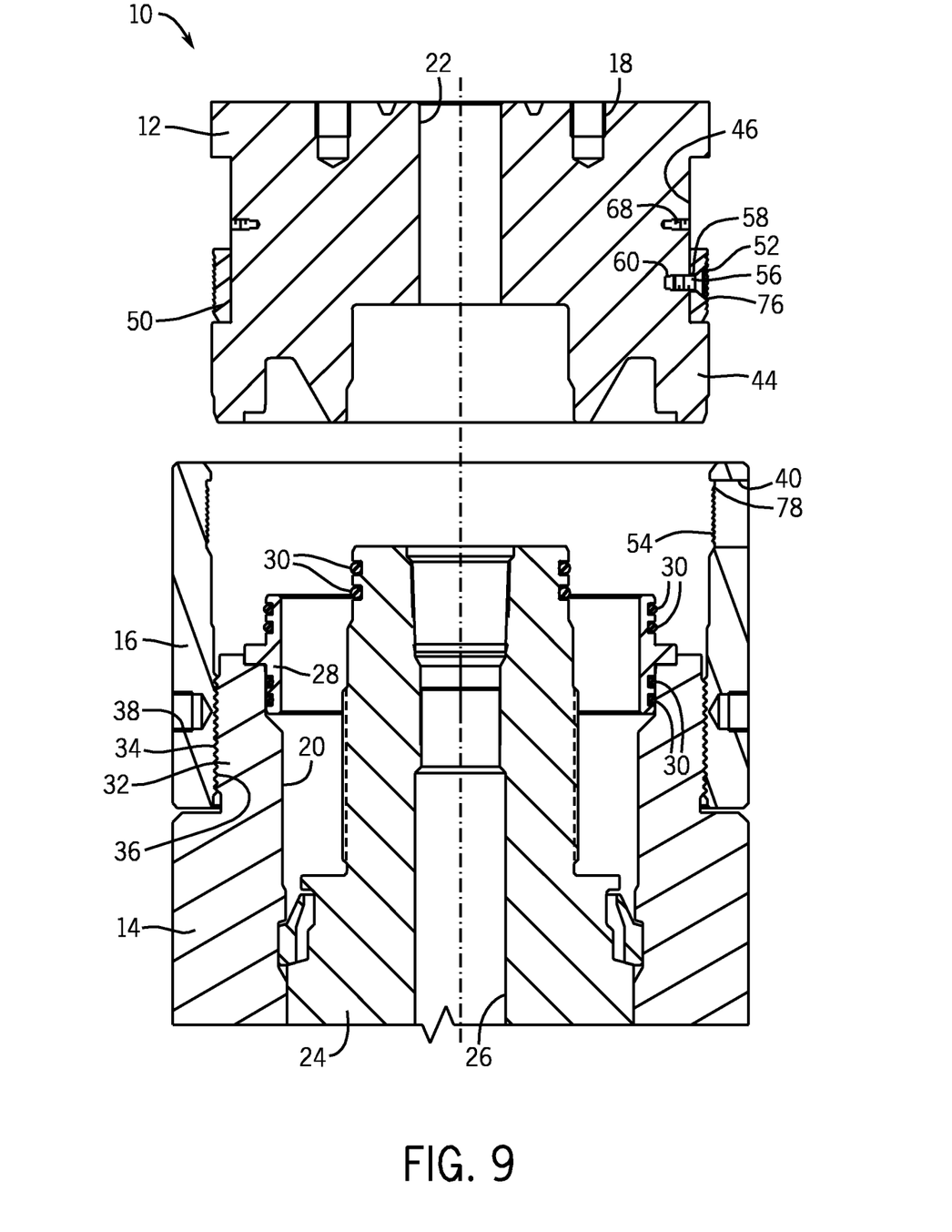
FIG. 9 is an exploded cross-sectional view of the system of FIG. 8, depicting the separation of the two connection members in accordance with one embodiment of the present invention.

For instance, an exemplary manner of uncoupling of the pin member 12 from the box member 14 is generally illustrated in FIGS. 8 and 9. In some embodiments, such as those including a split locking ring 62, the locking ring 62 is moved from the space between the load ring 50 and the pin member 12 and may be removed from the groove 46 entirely. Alternatively, a locking ring 62 (whether split or not) may instead be simply moved out of engagement with the load ring 50 and the pin member 12 and optionally secured in the groove 46 via set screws 64, as generally illustrated in FIG. 3. The load ring 50 may then be secured against the pin member 12 within the groove 46 via the set screws 56, as depicted in FIG. 8. Particularly, in one exemplary embodiment, a C-clamp may be advantageously used to align apertures 58 of the load ring 50 with recesses 60 of the pin member 12 such that the set screws 56 may be inserted through the window 40 and the apertures 58, and into the recesses 60. The pin member 12 may then be pulled apart from the box connection 14 as provided in FIG. 9.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a connector configured to secure a first component to a second component, wherein the connector comprises:
   a collar configured to receive the first component and the second component, wherein the collar includes a first coupling end configured to couple with the first component and a second coupling end configured to couple with the second component;

a load ring disposed within the second coupling end of the collar, wherein the load ring comprises a radial path of movement between a first radial position and a second radial position relative to the second coupling end, the load ring is radially spaced apart from the second coupling end of the collar in the first radial position, the load ring is in engagement with the second coupling end of the collar in the second radial position, at least one fastener selectively holds the load ring in the first radial position, and the load ring is automatically expandable from the first radial position to the second radial position upon release of the at least one fastener;

a locking ring disposed adjacent the load ring, wherein the locking ring comprises an axial path of movement between a first axial position and a second axial position relative to the load ring, the locking ring in the first axial position is disposed axially offset from the load ring in the first radial position, the locking ring in the second axial position is disposed axially overlapping with the load ring in the second radial position to block movement of the load ring to the first radial position, and the load ring blocks axial movement of the locking ring from the first axial position to the second axial position until after the load ring expands to the second radial position;

the second component having a groove, wherein the load ring is disposed radially between the collar and the second component within the groove, the at least one fastener selectively holds the load ring in the first radial position within the groove, the locking ring is disposed within the groove, the locking ring has the axial path of movement along the groove between the first and second axial positions, the locking ring comprises an aperture that selectively aligns with a recess in the second component when the locking ring is in the second axial position, and a set screw extends through the aperture and the recess to retain the locking ring in the second axial position.

2. The system of claim 1, wherein the load ring comprises a toothed surface that selectively engages a complimentary toothed surface of the second coupling end of the collar while the load ring is disposed in the second radial position.

3. The system of claim 1, wherein the locking ring is disposed radially between the load ring and the second component in the second axial position.

4. The system of claim 1, comprising the first component, wherein the first coupling end of the collar includes a threaded surface that selectively engages a complimentary surface of the first component to facilitate coupling of the first coupling end of the collar to the first component.

5. The system of claim 1, comprising the first and second components, wherein the first component comprises a box connection member, the second component includes a pin connection member having an outer surface with the groove, the load ring and the locking ring are disposed in the groove, and at least one of the box connection member or the pin connection member is coupled to an additional component.

6. The system of claim 1, wherein the locking ring comprises a split locking ring, and the load ring comprises a C-ring.

7. The system of claim 1, comprising the second component, wherein the at least one fastener selectively holds the load ring in the first radial position to facilitate insertion and removal of the second component from the collar.

8. The system of claim 1, wherein the collar comprises a window disposed over a portion of the load ring having the at least one fastener selectively holding the load ring in the first radial position.

9. The system of claim 1, comprising:

the first component including the collar threaded onto and extending from a first mating end of the first component;

the second component including a second mating end disposed within the collar;

the load ring disposed within a groove of the second component and within the collar, wherein the load ring comprises an outer surface positioned in engagement with a mating inner surface of the collar in the second radial position; and the locking ring disposed radially between the load ring and the second component in the second axial position, wherein the locking ring cooperates with the load ring to secure the second component to the first component.

10. The system of claim 9, wherein the outer surface of the load ring and the mating inner surface of the collar comprise mating teeth.

11. The system of claim 9, wherein the collar comprises a window axially aligned with the locking ring to permit a user to disengage the outer surface of the load ring from the mating inner surface of the collar via the window.

12. The system of claim 1, wherein the load ring is circumferentially split between opposite first and second end portions, the first end portion comprises a first receptacle, the second end portion comprises a second receptacle, and the at least one fastener comprises a first fastener disposed in the first receptacle and a second fastener disposed in the second receptacle.

13. The system of claim 12, wherein the first fastener comprises a first set screw and the second fastener comprises a second set screw.

14. The system of claim 12, wherein the collar comprises a window around a portion of the load ring having the first and second receptacles.

15. The system of claim 14, wherein the first coupling end of the collar includes a threaded surface that selectively engages a complimentary surface of the first component to facilitate coupling of the first coupling end of the collar to the first component, wherein the outer surface of the load ring and the mating inner surface of the collar comprise mating teeth.

16. The system of claim 1, wherein the locking ring in the second axial position is concentric with the load ring in the second radial position, and the locking ring in the second axial position overlaps at least one receptacle of the load ring for the at least one fastener.

17. The system of claim 1, wherein the locking ring has a first cylindrical surface, a second cylindrical surface, and an annular lip between the first and second cylindrical surfaces, wherein the first and second cylindrical surfaces have different diameters, wherein the annular lip is generally perpendicular to the first and second cylindrical surfaces, wherein the first cylindrical surface of the locking ring is configured to engage the load ring in the second axial position of the locking ring.

18. The system of claim 17, wherein the first cylindrical surface extends to a first axial end of the locking ring, and the second cylindrical surface extends to a second axial end of the locking ring.

19. The system of claim 17, wherein the load ring has a third cylindrical surface configured to engage the first cylindrical surface of the locking ring in the second axial position of the locking ring.

20. The system of claim 19, wherein the third cylindrical surface extends substantially along an entire length of the load ring.

21. A system, comprising:
a connector configured to secure a first component to a second component, wherein the connector comprises:
a collar configured to receive the first component and the second component, wherein the collar includes a first coupling end configured to couple with the first component and a second coupling end configured to couple with the second component, wherein the collar comprises a window;
a locking ring comprising a first cylindrical surface, a second cylindrical surface, and an annular lip between the first and second cylindrical surfaces, wherein the first and second cylindrical surfaces have different diameters, wherein the annular lip is generally perpendicular to the first and second cylindrical surfaces, wherein the first cylindrical surface extend to a first axial end of the locking ring, and the second cylindrical surface extends to a second axial end of the locking ring;
a load ring disposed within the second coupling end of the collar, wherein the load ring comprises a third cylindrical surface that extends substantially along an entire length of the load ring, wherein the load ring is circumferentially split between opposite first and second end portions, the first end portion comprises a first receptacle, the second end portion comprises a second receptacle, first and second fasteners selectively extend through the respective first and second receptacles to block movement of the load ring, the first and second fasteners are accessible through the window in the collar, and the load ring is automatically expandable from a first radial position to a second radial position upon release of the first and second fasteners from the respective first and second receptacles;
wherein the locking ring is selectively movable to a locked position concentric with the load ring and overlapping the first and second receptacles when the load ring is in the second radial position, wherein the locking ring has the first cylindrical surface engaged with the third cylindrical surface of the load ring in the locked position, wherein the annular lip of the locking ring axially abuts an axial end of the load ring in the locked position of the locking ring.

* * * * *